United States Patent
Utamaru

(10) Patent No.: US 10,630,077 B2
(45) Date of Patent: Apr. 21, 2020

(54) POWER MANAGEMENT APPARATUS, POWER MANAGEMENT SYSTEM, AND POWER MANAGEMENT METHOD

(71) Applicant: KYOCERA Corporation, Kyoto-shi, Kyoto (JP)

(72) Inventor: Tsudoi Utamaru, Yamato (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/553,554

(22) PCT Filed: Feb. 25, 2016

(86) PCT No.: PCT/JP2016/001014
§ 371 (c)(1),
(2) Date: Aug. 24, 2017

(87) PCT Pub. No.: WO2016/136260
PCT Pub. Date: Sep. 1, 2016

(65) Prior Publication Data
US 2018/0048155 A1    Feb. 15, 2018

(30) Foreign Application Priority Data
Feb. 25, 2015  (JP) .................. 2015-035637

(51) Int. Cl.
*H02J 3/32* (2006.01)
*G05B 15/02* (2006.01)
(Continued)

(52) U.S. Cl.
CPC ............ *H02J 3/32* (2013.01); *G05B 15/02* (2013.01); *H02J 7/0068* (2013.01); *H02J 3/383* (2013.01);
(Continued)

(58) Field of Classification Search
CPC .... H02J 3/32; H02J 7/0068; H02J 7/35; H02J 3/383; G05B 15/02; Y04S 20/222; Y02B 70/3225
See application file for complete search history.

(56) References Cited

U.S. PATENT DOCUMENTS 8,024,073 B2 * 9/2011 Imes .................. F24F 11/63 700/276
8,082,065 B2 * 12/2011 Imes .................. F24F 11/63 700/276
(Continued)

FOREIGN PATENT DOCUMENTS

JP   2000-341860 A   12/2000
JP   2007-60496 A    3/2007
(Continued)

OTHER PUBLICATIONS

Arakawa et al, Outline of Smart Power Supply System (SPSS) and Practical-scaled Demonstration Scheme, Japan, The Nissin Electric Review vol. 59, No. 1 (Apr. 2014), p. 38-59, retrieved on Apr. 3, 2018.

(Continued)

*Primary Examiner* — Charles R Kasenge
(74) *Attorney, Agent, or Firm* — Procopio Cory Hargreaves and Savitch LLP

(57) ABSTRACT

Power management apparatuses, power management systems, and power management methods for controlling power of a storage cell so as to allow appropriate compliance with requests from both the power supply side and the consumer side. A power management apparatus is provided in a consumer facility and includes a controller that manages the amount of stored electricity. The controller divides the amount of stored electricity at least into a first domain and a second domain and manages the domains, where the first domain is a domain in which to perform long-term control (Continued)

and the second domain is a domain in which to perform short-term control during power management in the consumer facility.

12 Claims, 11 Drawing Sheets

(51) Int. Cl.
*H02J 7/00* (2006.01)
*H02J 3/38* (2006.01)
*H02J 7/35* (2006.01)

(52) U.S. Cl.
CPC .............. *H02J 7/35* (2013.01); *Y02E 10/563* (2013.01); *Y02E 10/566* (2013.01); *Y02E 70/30* (2013.01)

(56) References Cited

U.S. PATENT DOCUMENTS

| | | | | |
|---|---|---|---|---|
| 8,335,596 B2* | 12/2012 | Raman | ................... | G06F 9/5094 700/295 |
| 8,359,124 B2* | 1/2013 | Zhou | ................... | G05B 13/024 700/276 |
| 8,519,566 B2* | 8/2013 | Recker | ................... | H02J 9/065 307/64 |
| 8,872,379 B2* | 10/2014 | Ruiz | ................... | B60L 11/1816 307/66 |
| 8,954,201 B2* | 2/2015 | Tepper | ................... | G05B 15/00 700/295 |
| 9,219,374 B2 | 12/2015 | Washiro et al. | | |
| 9,300,141 B2* | 3/2016 | Marhoefer | ................. | H02J 3/32 |
| 9,568,973 B2* | 2/2017 | Raman | .................. | G06F 9/5094 |
| 9,595,070 B2* | 3/2017 | Matsuoka | ................. | F24F 11/30 |
| 9,807,099 B2* | 10/2017 | Matsuoka | .......... | G06Q 30/0202 |
| 9,810,442 B2* | 11/2017 | Matsuoka | .......... | G05D 23/1904 |
| 10,338,622 B2* | 7/2019 | Nakasone | | |
| 2011/0106327 A1* | 5/2011 | Zhou | ................... | G05B 13/024 700/291 |
| 2011/0106328 A1* | 5/2011 | Zhou | ................... | G05B 13/024 700/291 |
| 2011/0153102 A1* | 6/2011 | Tyagi | ................... | G06Q 10/04 700/291 |
| 2011/0204720 A1* | 8/2011 | Ruiz | ................... | B60L 11/1816 307/66 |
| 2012/0016528 A1* | 1/2012 | Raman | ................... | G06F 9/5094 700/291 |
| 2012/0123995 A1* | 5/2012 | Boot | ................... | G01R 21/1333 706/54 |
| 2012/0130556 A1* | 5/2012 | Marhoefer | ................. | H02J 3/32 700/291 |
| 2012/0206108 A1* | 8/2012 | Waring | .................... | H02J 3/14 320/137 |
| 2012/0245744 A1* | 9/2012 | Prosser | .................... | H02J 3/46 700/286 |
| 2013/0103221 A1* | 4/2013 | Raman | .................. | G06F 9/5094 700/295 |
| 2013/0282193 A1* | 10/2013 | Tyagi | ..................... | H02J 3/008 700/291 |
| 2013/0335025 A1* | 12/2013 | Kuribayashi | .......... | B60L 53/68 320/109 |
| 2014/0028265 A1 | 1/2014 | Washiro et al. | | |
| 2014/0188295 A1 | 7/2014 | Saito et al. | | |
| 2014/0277761 A1* | 9/2014 | Matsuoka | .......... | G05D 23/1904 700/276 |
| 2014/0277769 A1* | 9/2014 | Matsuoka | ................ | F24F 11/30 700/278 |
| 2014/0277795 A1* | 9/2014 | Matsuoka | .......... | G06Q 30/0202 700/291 |
| 2015/0021991 A1 | 1/2015 | Wood et al. | | |
| 2015/0100171 A1* | 4/2015 | Behrangrad | ............. | H02J 3/12 700/291 |
| 2015/0295423 A1* | 10/2015 | Murayama | ................ | H02J 3/00 320/128 |
| 2016/0172859 A1* | 6/2016 | Marhoefer | ................ | H02J 3/32 700/295 |

FOREIGN PATENT DOCUMENTS

| | | |
|---|---|---|
| JP | 2011-205824 A | 10/2011 |
| JP | 2012-235541 A | 11/2012 |
| JP | 2014-27800 A | 2/2014 |
| JP | 2014-168315 A | 9/2014 |
| WO | 2013/179344 A1 | 12/2013 |
| WO | 2014/140990 A2 | 9/2014 |

OTHER PUBLICATIONS

Kaibuki et al, Electrochemical Properties of Vanadium Ions for Redox Flow Battery, Sumitomo Electric Industries, Ltd., Japan, The 42nd Battery Symposium in Japan, Nov. 21-24, 2001, p. 346-347, retrieved on Apr. 3, 2018.

International Search Report dated May 10, 2016, issued by Japan Patent Office for International Application No. PCT/JP2016/001014.

Written Opinion dated May 10, 2016, issued by Japan Patent Office for International Application No. PCT/JP2016/001014.

* cited by examiner

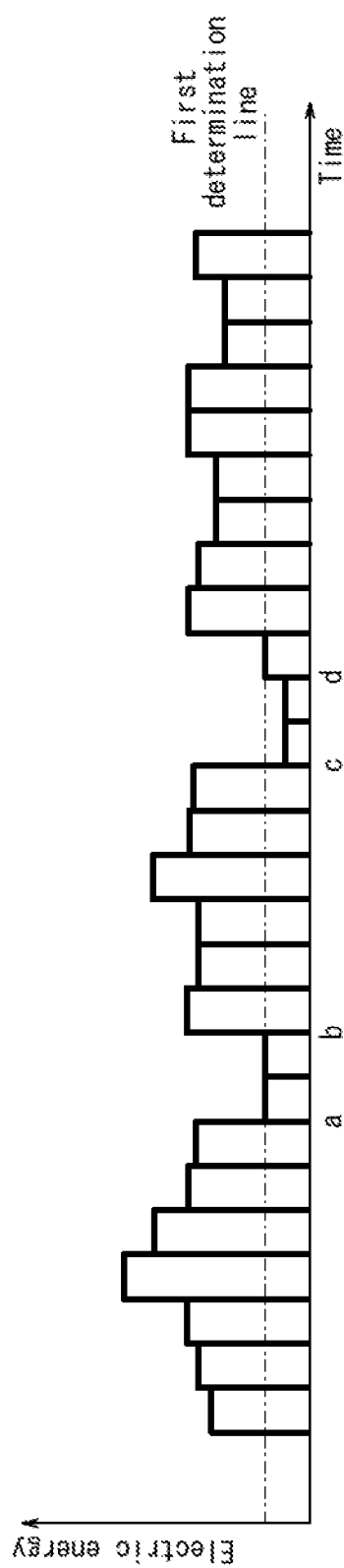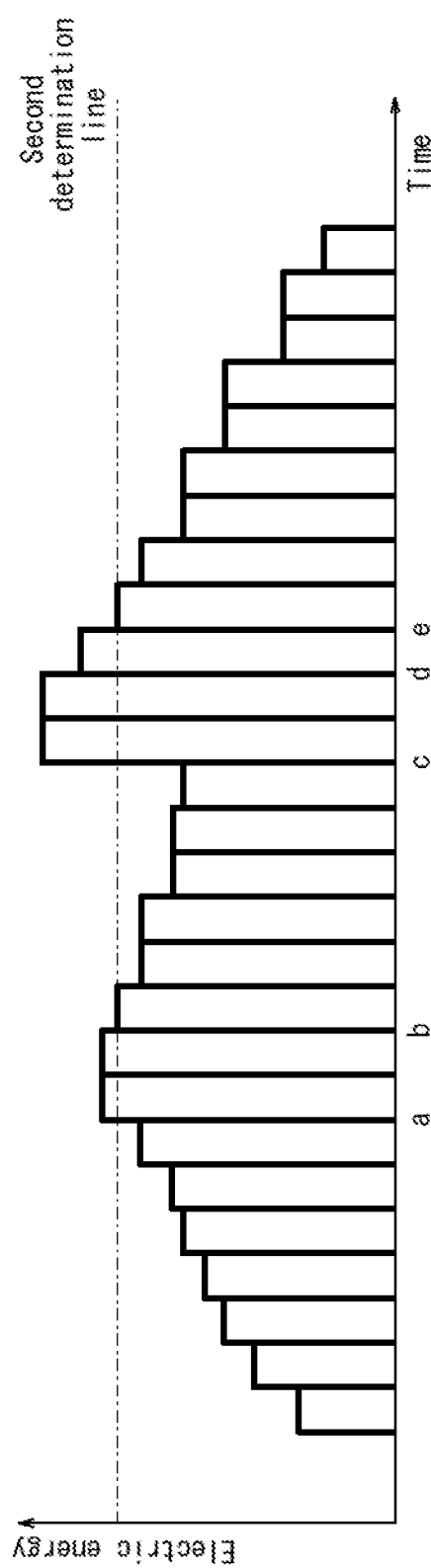

POWER MANAGEMENT APPARATUS, POWER MANAGEMENT SYSTEM, AND POWER MANAGEMENT METHOD

CROSS-REFERENCE TO RELATED APPLICATION

This application claims priority to and the benefit of Japanese Patent Application No. 2015-35637 filed Feb. 25, 2015, and International Application No. PCT/JP2016/001014, filed Feb. 25, 2016, the entire contents of which are incorporated herein by reference.

TECHNICAL FIELD

This disclosure relates to a power management apparatus, a power management system, and a power management method.

BACKGROUND

In recent years, research has progressed on power supply systems that include a power control apparatus (inverter) that converts power and supports both storage cells and power generation apparatuses such as solar cells, for example. Such a power supply system can also charge a storage cell with the power output from a power generation apparatus. When using a storage cell as the power source that supplies power to a load, the amount of stored electricity in the storage cell can be determined by measuring the state of charge (SOC) of the storage cell (for example, see patent literature PTL 1). Demand thus exists for effective use of storage cells.

CITATION LIST

Patent Literature

PTL 1: JP 2012-235541 A

SUMMARY

Solution to Problem

A power management apparatus according to one embodiment of this disclosure includes a controller configured to control an amount of stored electricity in a storage cell installed in a consumer facility. The controller divides the amount of stored electricity at least into a first domain and a second domain and manages the first domain and the second domain. The power management apparatus treats the first domain as a domain in which to perform long-term control during power management in the consumer facility. The power management apparatus treats the second domain as a domain in which to perform short-term control during power management in the consumer facility.

A power management system according to one embodiment of this disclosure includes a storage cell and a power management apparatus installed in a consumer facility. The power management apparatus includes a controller configured to control an amount of stored electricity in the storage cell. The controller divides the amount of stored electricity at least into a first domain and a second domain and manages the first domain and the second domain. The power management system treats the first domain as a domain in which to perform long-term control during power management in the consumer facility. The power management system treats the second domain as a domain in which to perform short-term control during power management in the consumer facility.

A power management method according to one embodiment of this disclosure is used in a power management apparatus installed in a consumer facility. The method includes dividing an amount of stored electricity of a storage cell at least into a first domain and a second domain and managing the first domain and the second domain. The first domain is treated as a domain in which to perform long-term control during power management in the consumer facility. The second domain is treated as a domain in which to perform short-term control during power management in the consumer facility.

BRIEF DESCRIPTION OF THE DRAWINGS

In the accompanying drawings:

FIGS. 6A and 6B conceptually illustrate operations of a power management apparatus according to an embodiment.

DETAILED DESCRIPTION

[System Configuration]

The power management system according to this embodiment is mainly configured to include a device for managing electrical energy, which is used by a consumer of power and/or a supply-side power grid, and a plurality of storage cells connected to the power grid. This system may include a power load installed in a consumer facility. For example, the storage cells adjust the electric energy that the consumer supplies to or demands from the power grid during a demand interval. This system may be configured either for grid connection or for independent operation. Also, the connection over the network 5 to the devices in this system may be configured in any way.

Figure 1:
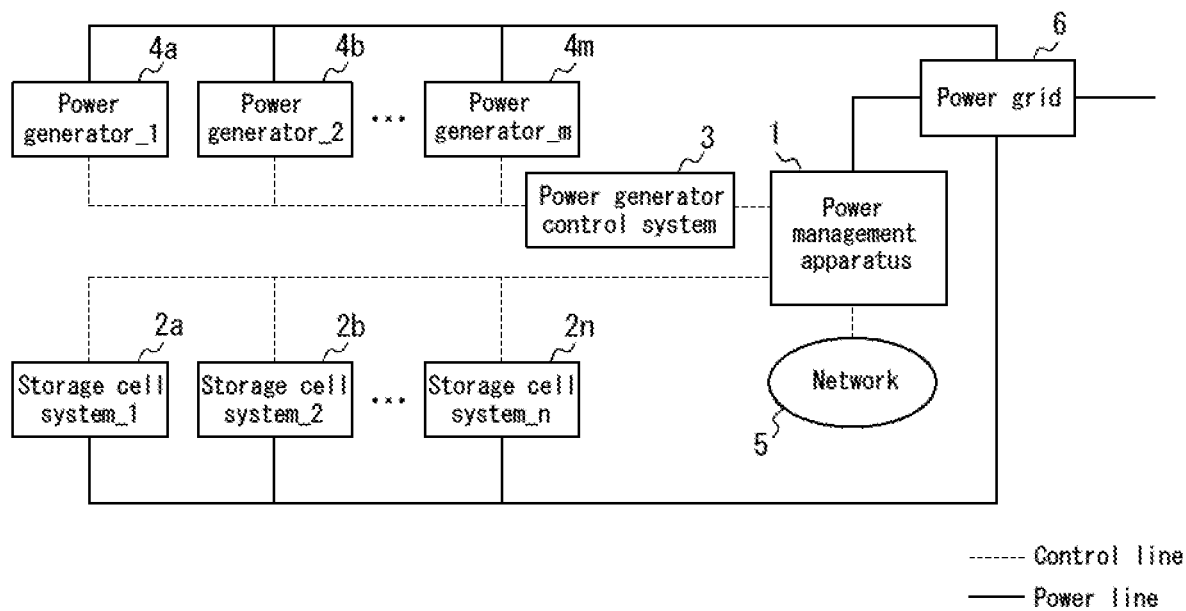
FIG. 1 illustrates the configuration of a power management system according to an embodiment.

As illustrated in FIG. 1, a power management apparatus 1, a storage cell system 2, a power generator control system 3, a power generator 4, the network 5, and a power grid 6 are connected in the power management system according to this embodiment. The storage cell system 2 includes one or more storage cell systems, such as a storage cell system_1 2a, a storage cell system_2 2b, . . . , and a storage cell system_n 2n. The power generator 4 includes one or more power generators, such as a power generator_1 4a, a power generator_2 4*b*, . . . , and a power generator_m 4*m*. As necessary, the below-described power management system according to this embodiment of the disclosure includes fuel cells, solar cells, and the like as the power generators.

Figure 2:
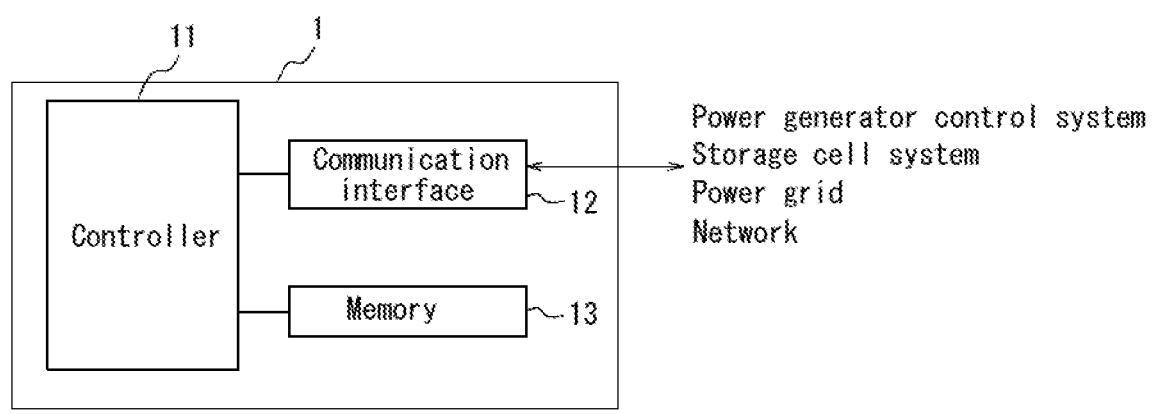
FIG. 2 is a functional block diagram of a power management apparatus according to an embodiment.

As illustrated in FIG. 2, the power management apparatus 1 is connected to a power network and includes a controller 11, a communication interface 12, and a memory 13. Although the functions of the power management apparatus 1 according to this disclosure are described below, it should be noted that other functions provided in the power management apparatus 1 are in no way excluded. For example, the power management apparatus 1 can be configured as a computer. The power management apparatus 1 can store a program containing a description of the processing for achieving the functions of the controller 11 and other components in the memory 13 of the computer and can implement the functions by having a central processing unit (CPU) of the computer read and execute the program.

The controller 11 controls the various operations of the power management apparatus 1. For example, the controller 11 can calculate the charging/discharging time for one storage cell. The controller 11 can also control the storage cell systems 2 by transmitting the control content of the controller 11 (for example, a control signal) to the storage cell systems 2 over the communication interface 12.

The communication interface 12 communicates with the storage cell systems 2, the power generator control system 3, the network 5, the power grid 6, and the like over a wired or wireless connection.

The memory 13 stores information necessary for processing of each component in the power management apparatus 1, such as measurement data and the determined content of power storage control.

Figure 3:
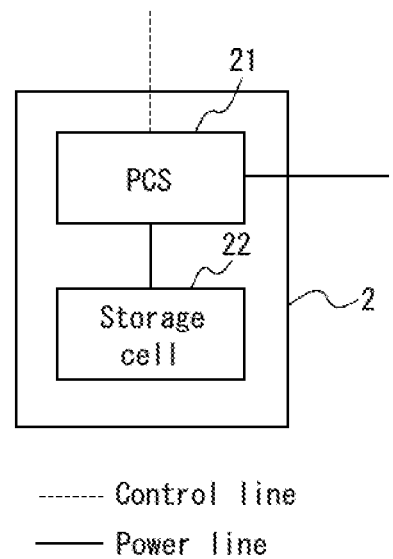
FIG. 3 is a functional block diagram of a storage cell system according to an embodiment.

As illustrated in FIG. 3, each storage cell system 2 includes a power conditioning system (PCS) 21 and a storage cell 22. For example, the storage cell system 2 is used to adjust the electric energy that the consumer supplies to or demands from the power grid 6 during each demand interval. Although the functions of the storage cell system 2 are described below, it should be noted that other functions provided in the storage cell system 2 are in no way excluded. In this embodiment, the location where such a storage cell 22 is installed is envisioned as being, for example, a facility, factory, warehouse, distribution center, building, store, or residential household that generates power by large-scale solar power generation, wind power generation, or the like. The power management system according to the below-described embodiment may, as necessary, include a storage cell such as a lithium-ion battery or a lead battery.

More than one of each of the above-described functional blocks may be provided, with processing being divided therebetween. Also, different functional blocks may be integrated.

[Concept of Operations of Power Management Apparatus]

As described below, a "demand response (DR) request" refers to a request that is related to power reduction and is issued by a power company mainly when the power supply of the power company is in a tight state. A consumer who receives such a request and reduces power usage during the designated demand interval receives a reward from the power company according to the reduction amount. Upon receiving such a request, the consumer notifies the power company of whether the consumer will reduce usage and of the target reduction amount. It is envisioned that if the actual reduction amount falls short of the target reduction amount when complying with the DR request, the reward will be reduced in proportion to the shortfall.

Various patterns for notification timing of a DR request have been proposed, such as the day before, 12 hours before, one hour before, 30 minutes before, and 5 minutes before. As the notification is provided less in advance, it becomes more difficult to comply with the request. It is also envisioned that such requests will tend to be issued only at particular times of the year, such as a time slot in which air conditioning is frequently used in the summer (for example, 14:00 to 16:00).

The "leveling" of power as described below has the following aim. Leveling aims to submit to the power company, on the day before, a planned value (predicted value) of a one-day amount of purchased electric energy, in units of demand intervals (such as 30 minutes), to be used on the next day and to make adjustments so that the actual power usage falls within a variable range of the submitted pre-planned value (for example, ±3%). Such a planned value of the electric energy can be a supply amount, a planned purchase amount, or a demand amount of power. Operation whereby a penalty must be paid to the power company when the actual power usage exceeds the variable range of the pre-planned value is also envisioned. The storage cells that are installed in a power generation system are used mainly for the purpose of leveling.

The difference between the planned value of power submitted the day before and the actual value of power used on the next day is affected by factors such as the weather or the number of customers in a store. Using statistical data related to the difference, the power management apparatus can make predictions for time slots in which such a difference tends to occur. For example, it can be determined that no difference occurs between 0:00 and 6:00, whereas a large difference tends to occur from 8:00 to 10:00 and from 18:00 to 22:00.

In this embodiment, the following conditions are envisioned as conditions for operation of the power management system. Circumstances requiring that the total actual value for a group of power consumers be matched to the amount of procured power by implementing leveling in each store included in the group of power consumers are envisioned. A power producer and supplier (PPS) representative, referred to as an aggregator, acts as an intermediary between the power supply side, such as power companies and power producers, and the power demand side, such as the above-described group of power consumers. Aggregators are businesses that bundle the power demand in consumer facilities and engage in energy management. It is envisioned that aggregators will create a list of stores that are good at complying with DR requests, and at the time of a DR request, will select the stores to comply with the DR request by giving priority to the stores included on the list.

In this embodiment, the electric energy to be used at the time of a DR request is reserved as DR adjustment capacity in accordance with the state of the SOC of the storage cell and the planned value of power supply and demand (for example, the planned value of demand on the next day for a store), calculated by the power management apparatus, at the location where the system is installed. Furthermore, in this embodiment, the capacity other than the DR adjustment capacity that is reserved in this way is used to implement leveling control. In other words, in this embodiment, the amount of power used to prevent contract power exceedance is reserved as peak cut control capacity. Also, the amount of power used to comply with a DR request is reserved as DR request compliance capacity. Furthermore, the storage cell SOC for covering the amount of power used for power leveling is reserved as leveling control capacity. Since the SOC is used in each instance of such control, the units for capacity are all designated as percentages. In this embodiment, the adjustment capacities reserved in this way are used for a peak cut, DR request compliance, and leveling control.

In this embodiment, the power management apparatus 1 is provided in a consumer facility. As described above, the power management apparatus 1 includes the controller 11 that manages the amount of stored electricity in the storage cell 22. In this embodiment, when managing the amount of stored electricity in the storage cell 22, the controller 11 divides the amount of stored electricity in the storage cell 22 into at least a first domain and a second domain and manages the first and second domains. During management of stored electricity in the storage cell 22 by the controller 11, the power management apparatus 1 treats the first domain as a domain in which to perform long-term control during power management in a consumer facility and the second domain as a domain in which to perform short-term control during power management in the consumer facility. In this way, this embodiment divides the amount of stored electricity in the storage cell 22 into the first domain and the second domain and allocates the amount of stored electricity of the storage cell to these domains.

In this embodiment, the aforementioned "long-term control" is, for example, control of the integrated power during a relatively long predetermined time period, such as a demand interval. The demand interval can, for example, be a length of time such as 30 minutes in Japan, 15 minutes in Germany, and 60 minutes in the USA.

In this embodiment, the aforementioned peak cut control (prevention of contract power exceedance) can be treated as long-term control. For example, in this embodiment, the "long-term control" can be treated as control in accordance with the integrated power consumption during a predetermined time period in the consumer facility. Such control can, for example, be control so that the integrated power consumption in a predetermined time period does not exceed a predetermined threshold or control to reduce the peak of power consumption in a predetermined time period.

In this embodiment, the "short-term control" can, for example, be treated as control of the instantaneous value of power consumption during a relatively short predetermined time period, such as several milliseconds. For example, in this embodiment, the short-term control can be treated as control in accordance with the instantaneous value of power consumption in the consumer facility, such as control to reduce the instantaneous value or to maintain the instantaneous value in a certain range.

In greater detail, by managing the amount of stored electricity in the storage cell, the above-described leveling control reduces the incremental difference between the amount of stored electricity in the storage cell and the purchased power established by the power purchase plan. This leveling control can be treated as short-term control in this embodiment. Leveling control is control so that the power consumed at a consumer facility falls within ±3%, for example, of a target value of power consumption determined the day before by a contract between a PPS and a consumer. Since a concentration of power consumption at the start of a demand interval increases the effect on the voltage or frequency of the grid, the leveling control in this embodiment can be treated as short-term control, as described above.

The leveling control is not limited to short-term control of the instantaneous value of power as described above and may, for example, instead be short-term control of the integrated power during a period of time, such as several minutes to under 20 minutes, that is shorter than a relatively long period of time, such as the above-described demand interval. Furthermore, the leveling control is not limited to being short-term control, and may be managed as long-term control. For example, in Japan, the leveling control can be performed as long-term control to allow control with 48 demand intervals lasting 30 minutes each over a 24-hour period.

In this embodiment, once a DR request issued over the network is acquired, control of the above-described instantaneous value of the actual power consumption to vary within a certain range, i.e. control for DR request compliance, can also be treated as short-term control. It is also envisioned that DR requests issued over the network, from a general electricity utility or a PPS, will include requests for a reduction, for example 5 or 15 minutes later, of the current power consumption by a predetermined proportion, such as a percentage. In such a case, the power demand might be strong, and it is envisioned that compliance with the DR request may not be possible with the above-described long-term control. In this case, control for complying with the DR request may be treated as short term control and further controlled in accordance with the instantaneous value of power consumption in the consumer facility.

When the power demand is not so strong, control for DR request compliance need not be control according to the instantaneous value. In this case, the control for DR request compliance may, for example, instead be short-term control of the integrated power during a period of time, such as several minutes to under 20 minutes, that is shorter than a relatively long period of time, such as the above-described demand interval.

Furthermore, the control for DR request compliance is not limited to being short-term control, and may be managed as long-term control, for example. DR requests are envisioned as including a request to reduce power, during a period of time of the request (for example, in the case of a three-hour request, six demand intervals lasting 30 minutes each), by a predetermined amount, e.g. kWh, from the average power consumption during the four days with the greatest power consumption over the previous five days. In such cases, the control for DR request compliance can be treated as long-term control.

In this embodiment, the controller 11 may also vary, by season, the ratio between the first domain and the second domain or the amount of stored electricity allocated to each of the first domain and the second domain. For example, the amount of stored electricity allocated to the first domain in the summer or the winter may be greater than the amount of stored electricity allocated to the first domain in spring or autumn. The reason is that more power is assumed to be required for long-term control such as peak cut control during seasons in which heating and air-conditioning are often used, e.g. summer or winter, than seasons in which heating and air-conditioning are rarely used, e.g. spring or autumn.

Furthermore, in this embodiment, the controller 11 can perform whichever of the short-term control and the long-term control has higher economic efficiency on a priority basis. By performing such control, the power management system according to this embodiment can increase the economic efficiency.

The above-described example of long-term control and short-term control can be represented as follows in Table 1.

TABLE 1

| | |
|---|---|
| Long-term control | Integrated power during demand interval (peak cut control) |
| Short-term control | Integrated power during a time period shorter than a demand interval |
| | Control for DR request compliance |
| | Leveling control |
| | Instantaneous value control |

Figure 4:
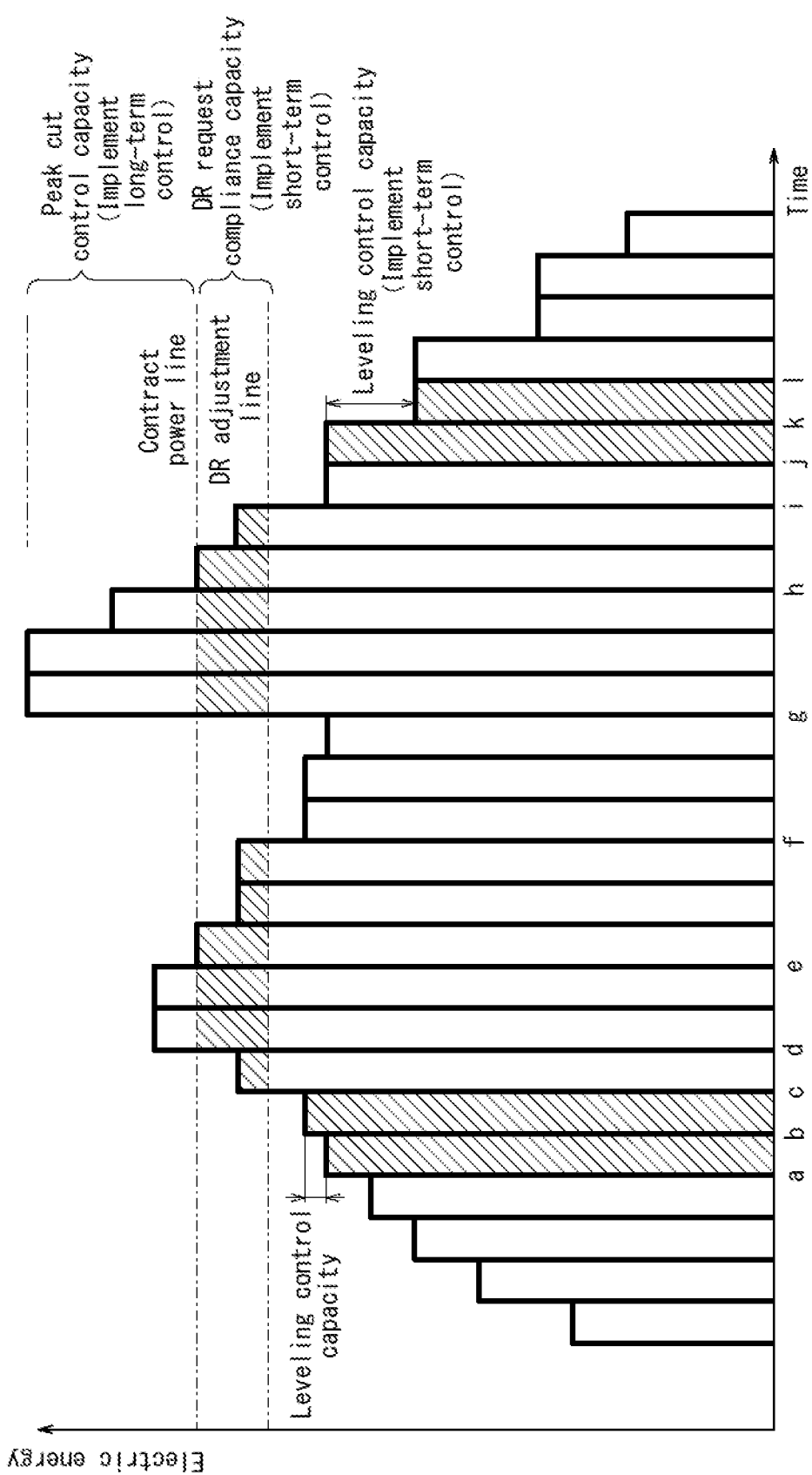
FIG. 4 conceptually illustrates operations of a power management apparatus according to an embodiment.

FIG. 4 illustrates the change over time in the planned value of power (electric energy) on an appointed day for the entire consumer group in the contract area where the power management system is installed. Here, the planned value on the appointed day refers to data stored in a management table when the power management apparatus 1 included in the power management system performs power management, and is preferably updated in real time as changes occur.

The contract power line in FIG. 4 is a standard indicating the upper limit on power per the contract between the power company and the consumer group in the area where the power management system is installed. It is assumed that exceeding this power will result in consequences such as an increase in the electricity charge. In this embodiment, the power management apparatus 1 therefore reserves peak cut control capacity in the storage cell in order to perform peak cut power control at times when the contract power line is likely to be exceeded. In the example illustrated in FIG. 4, the planned value of power on the current day exceeds the contract power line from times d to e and from times g to h. Accordingly, power for peak cut control at these times is reserved in the storage cell 22. When the power management system includes solar cells, the peak cut control capacity is preferably determined by also including the predicted value of power generation by the solar cells.

The DR adjustment line in FIG. 4 indicates the standard power when complying with the DR request in the consumer group. It is predicted that notification of a DR request will be received, and that the DR request can be complied with, when the power of the entire consumer group exceeds this DR adjustment line. In the present embodiment, the power management apparatus 1 therefore reserves DR request compliance capacity in the storage cell in order to comply with the DR request at the times when the DR adjustment line is likely to be exceeded. The standard for determining whether to comply with the DR request is described below in greater detail. In the example illustrated in FIG. 4, the planned value of power on the appointed day exceeds the DR adjustment line at times c to f and times g to i. Accordingly, power for complying with a DR request at these times is reserved in the storage cell 22.

In FIG. 4, other than times between times a to c and times j to l, the planned value of power on the current day and the actual value on the current day match. Therefore, it is determined not to perform leveling control at times other than times a to c and times j to l. At times a to c and times j to l, however, the difference (variable range) between the planned value of the electric energy as submitted to the power company on the previous day and the actual value on the current day exceeds a predetermined range (for example, 3%), as illustrated in FIG. 4. If the consumer facility is a store, it is assumed that such times a to c and times j to l correspond to opening and closing of the store. In this embodiment, the power management apparatus 1 reserves leveling control capacity in the storage cell in order to perform power control for leveling at such times. In the example illustrated in FIG. 4, it is determined to perform leveling control at times a to c and times j to l. Accordingly, the power to perform power control for leveling at these times is reserved in the storage cell 22.

In this way, the power management apparatus 1 according to this embodiment connects to the grid 6 and controls power of distributed power sources that include the storage cell 22. The power management apparatus 1 also controls the electric energy stored in the storage cell 22 in accordance with the electric energy for performing peak cut control and the electric energy for at least one of leveling control and DR request compliance. Here, the peak cut control is power control to prevent the power consumption at a predetermined time from exceeding a predetermined amount. In greater detail, this power control can be power control to reduce the peak power demand by preventing the power consumption at a predetermined time from exceeding a predetermined amount. The leveling control is power control corresponding to a power supply plan or a power demand plan. In greater detail, this power control can be performed so that the variation between the electric energy in the power supply plan or power demand plan submitted in advance and the electric energy actually used stays within a predetermined range. DR request compliance refers to compliance with a request (DR event notification), from the power supply side, related to power consumption. In greater detail, this compliance can be achieved by performing power control so that the variation between the electric energy consumption in the request received from the power supply side and the electric energy actually used stays within a predetermined range.

In this embodiment, the capacity for control to prevent contract power exceedance, the capacity for leveling control, and the capacity for control for DR request compliance are assigned a priority ranking. Priority rankings are assigned in descending order, starting with the capacity reserved for control with the greatest financial impact. In this embodiment, the specific capacity for control is determined in accordance with the priority rankings assigned in this way. Details on the control performed by the power management apparatus 1 at this time are provided below.

The power management apparatus 1 according to this embodiment may thus preferentially perform power control with high economic efficiency from among the peak cut control, leveling control, and DR request compliance.

In this embodiment, the calculation of the above-described capacity for control assumes that control is performed on the capacity of one storage cell. In other words, even if a plurality of storage cells is installed, the storage cells are regarded as one storage cell, and the capacity of the storage cells as a whole is controlled. In this case, factors such as the specification and type of storage cells are irrelevant. In greater detail, if two storage cells A and B are installed, capacities for the above-described various types of control are reserved for both storage cell storage cells A and B. Accordingly, control such that storage cell A is used as capacity for peak cut control and DR request compliance and storage cell B is used as capacity for leveling control, for example, is preferably not performed.

Figure 5:
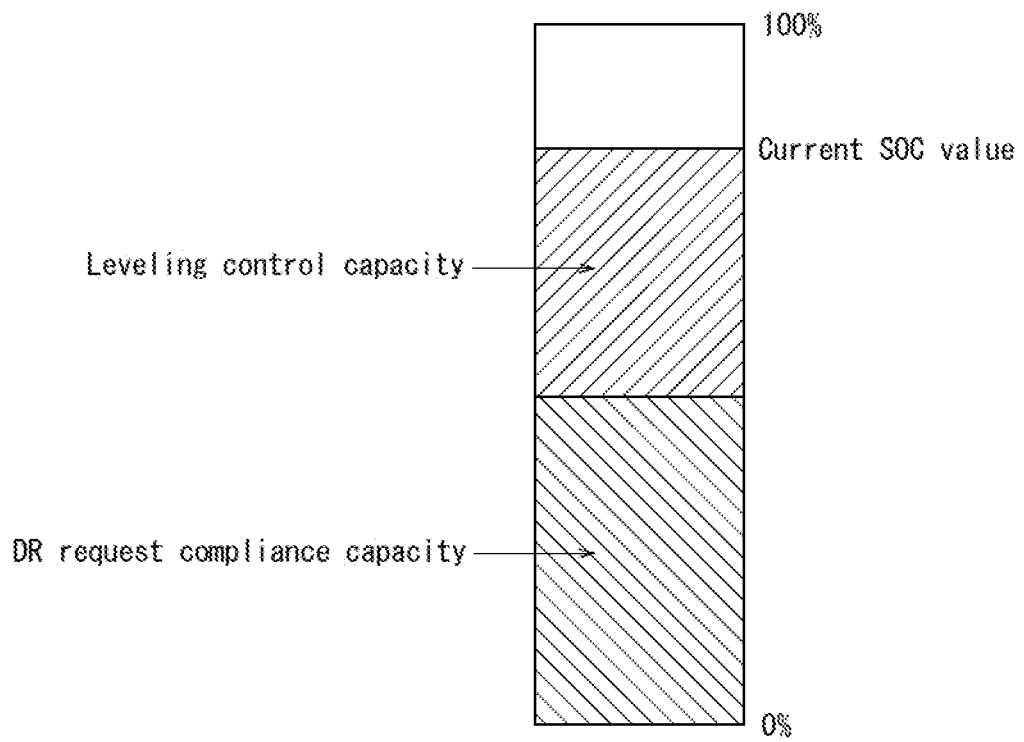
FIG. 5 conceptually illustrates operations of a power management apparatus according to an embodiment.

For example, even if the power management system according to this embodiment includes a plurality of storage cells, the SOC is managed as a whole, the plurality of storage cells are grouped together, and the leveling control capacity, capacity for DR request compliance, and other capacities are reserved from the current SOC value, as illustrated in FIG. 5.

In this way, in the power management apparatus 1 according to this embodiment, the distributed power sources preferably include a plurality of storage cells 22, and the electric energy stored in the storage cells 22 as a whole is preferably controlled as one electric energy.

In this embodiment, it is also determined whether to reserve DR request compliance capacity and the specific value of DR request compliance capacity in accordance with a power supply reserve ratio acquired from the power company and the planned value of power supply and demand (which the power management apparatus 1 acquires over a network), for the entire contract area where the power management system is installed. In other words, even when information on the DR request cannot be acquired the day before, it can be determined whether to reserve DR request compliance capacity and the specific value thereof in accordance with the aforementioned power supply reserve ratio and planned value of power supply and demand.

FIG. 6A illustrates the predicted value, acquired from the power company on the previous day, of the reserve ratio of power for the next day. Such information can be acquired over the network 5 by the communication interface 12 of the power management apparatus 1. FIG. 6B illustrates a predicted value, obtained on the previous day from the aggregator or the power management apparatus 1, of the total power of the entire consumer group on the next day in the contract area where the power management system is installed. Both FIGS. 6A and 6B illustrate the change over time in the predicted value of power (electric energy).

In this embodiment, as illustrated in FIGS. 6A and 6B, a predetermined decision criterion is set for both the predicted value of the reserve ratio of power of the power company and the predicted value of the power of the consumer group. For example, as illustrated in FIG. 6A, a first determination line is set as a predetermined decision criterion. It is determined that notification of a DR request is highly likely to be received when the predicted value of the reserve ratio of power falls below this first criterion line. Such a decision criterion is set appropriately on the basis of past trends. The appropriate criterion can, for example, be set to a fixed value of the minimum line (for example, 3%) of the reserve ratio announced by the power company. The appropriate criterion can also be a statistical variable or the like calculated using these numerical values and the past record of received DR requests. In FIG. 6A, at times a to b and times c to d, the predicted value of the reserve ratio of power falls below the first determination line. As indicated in FIG. 6B, a second determination line is also set as a predetermined decision criterion. It is determined that a DR request can be complied with when the predicted value of power is above the second determination line. At such times, it is envisioned that the amount of demand or the amount of supply of power will be large. Hence, it can be determined that notification of a DR request is highly likely to be received. Such a decision criterion is also set appropriately on the basis of past trends. The appropriate criterion can, for example, be a statistical variable or the like calculated using the actual power values from the past for the consumer group and the record of received DR requests. In FIG. 6B, at times a to b and times c to e, the predicted value of power falls is above the second determination line. As illustrated in FIG. 6A and 6B, in this embodiment, the time slots where the times when the predicted value falls below the first determination line overlap with the times when the predicted value is above the second determination line (times a to b and times c to d) are determined to be planned times for DR request compliance. Since the likelihood of a DR request being issued is extremely high in these time slots, these time slots can be determined to be planned times for DR request compliance.

Details on the control performed by the power management apparatus 1 at this time are provided below.

[Specific Operations of Power Management Apparatus]

Figure 7:
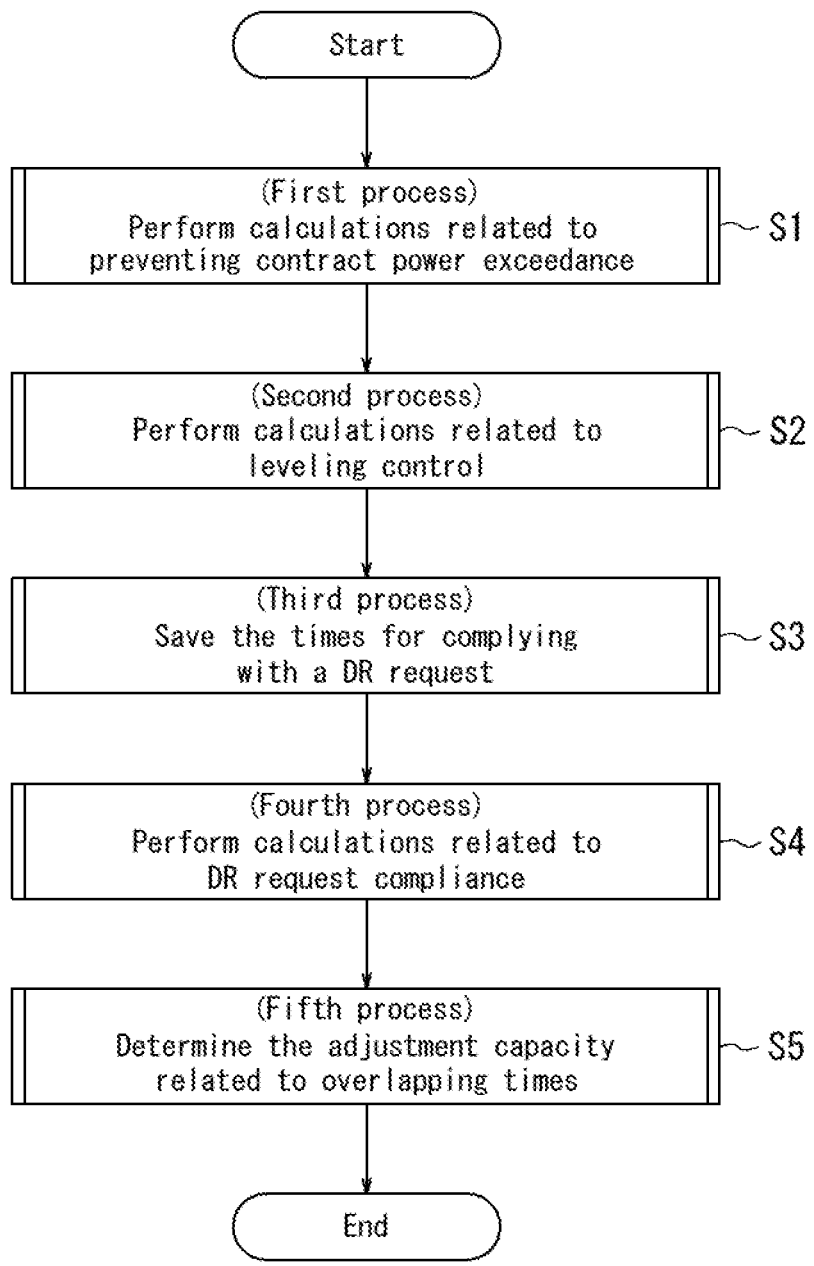
FIG. 7 is a flowchart illustrating operations of a power management apparatus according to an embodiment.

As illustrated in FIG. 7, in general terms, the power management apparatus 1 executes the processes in steps S1 to S5 below.

In step S1, the power management apparatus 1 performs calculations related to preventing contract power exceedance (first process).

In step S2, the power management apparatus 1 performs calculations related to leveling control of power (second process).

In step S3, the power management apparatus 1 saves the times for complying with a DR request (third process).

In step S4, the power management apparatus 1 performs calculations related to DR request compliance (fourth process).

In step S5, the power management apparatus 1 determines the adjustment capacity related to overlapping times (fifth process).

More specific examples of these processes are described below.

[First Process]

Figure 8:
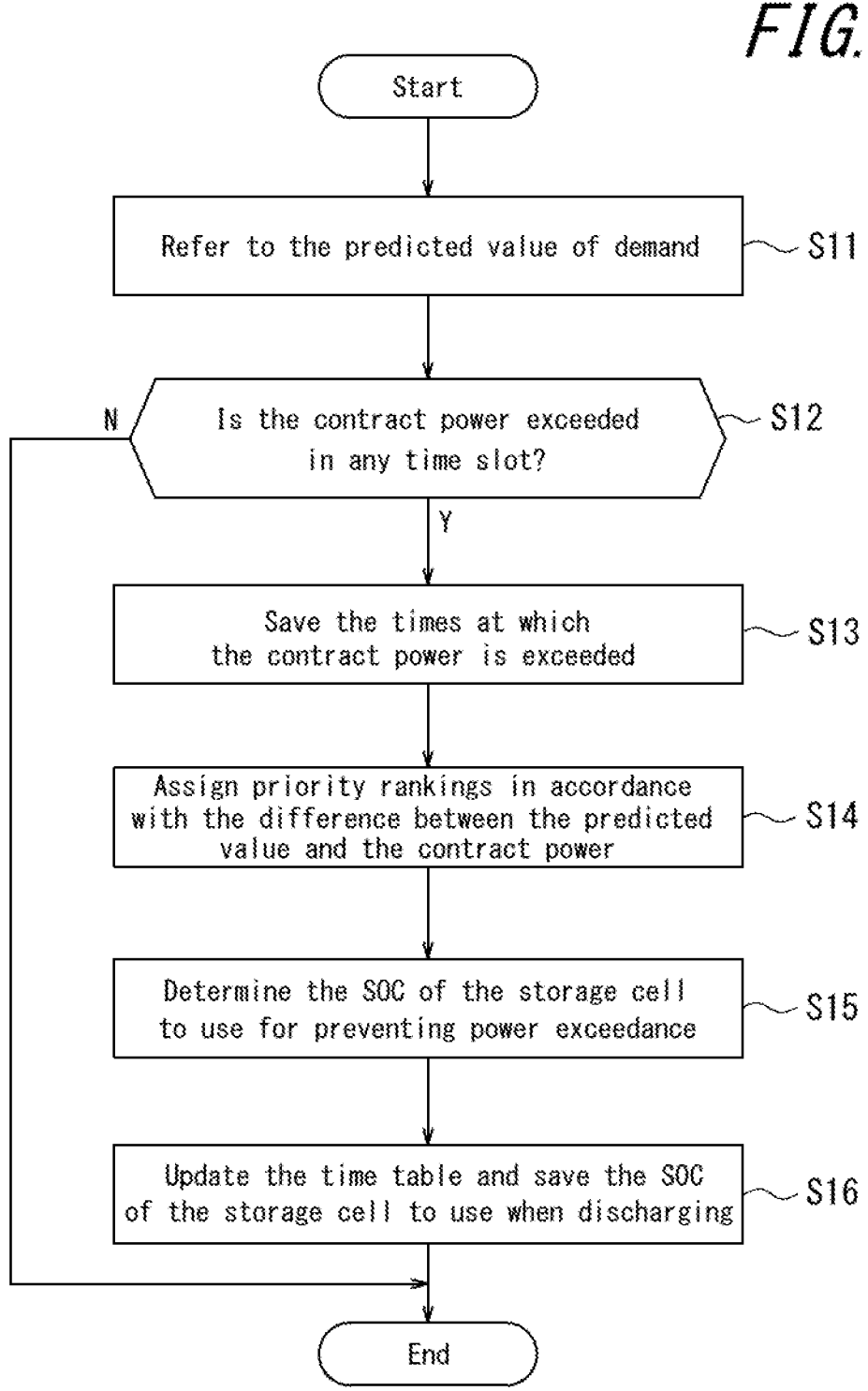
FIG. 8 is a flowchart illustrating operations of a power management apparatus according to an embodiment.

Once the process illustrated in FIG. 8 begins, the controller 11 of the power management apparatus 1 refers to the latest predicted value of demand for power (step S11). This predicted value of demand for power can, for example, be acquired by the communication interface 12 over the network 5 or the like and be stored in the memory 13.

After referring to the predicted value of demand for power in step S11, the controller 11 determines whether the predicted value of demand for power exceeds the power agreed upon by contract in any time slot (step S12). When the controller 11 determines in step S12 that the predicted value of demand does not exceed the contract power in any time slot, the controller 11 terminates this process, since contract power exceedance does not need to be prevented.

When determining in step S12 that the predicted value of demand exceeds the contract power in one or more time slots, the controller 11 saves those times (step S13). The times are, for example, saved in a contract power exceedance time table in the memory 13, system internal memory, or another memory location. In greater detail, when the contract power is 380 kW, for example, and the predicted value of demand for power is 385 kW during the time slot 11:00 to 11:29 on a specific day, then that specific day and time slot are saved.

After saving the times in step S13, the controller 11 calculates the difference between the predicted value of demand and the contract power in each time slot during which the predicted value exceeds the contract power and assigns a priority ranking in accordance with the magnitude of the difference (step S14). In greater detail, in the case of time slots in which the predicted value of demand exceeds the contract power by 5 kW, 15 kW, and 10 kW, the time slots are respectively assigned rank 3, rank 1, and rank 2 as priority rankings.

After assigning the priority rankings in step S14, the controller 11 determines the storage cell SOC to use for preventing power exceedance (step S15). For this process, it is assumed that the controller 11 knows the correspondence relationship between the SOC of the storage cell system as a whole and the electric energy.

After determining the storage cell SOC in step S15, the controller 11 updates the contract power exceedance time table and saves the storage cell SOC to use when discharging (step S16). This information is, for example, saved in the memory 13, system internal memory, or another memory location. For example, the power exceedance on the specific date and time to which the above-described priority ranking of 1 was assigned is 15 kW, and a sequence of information determined in order to cover this amount is saved, such as 9% SOC usage of storage cell A, 15% SOC usage of storage cell B, and so forth. This process is performed for each rank.

[Second Process]

Figure 9:
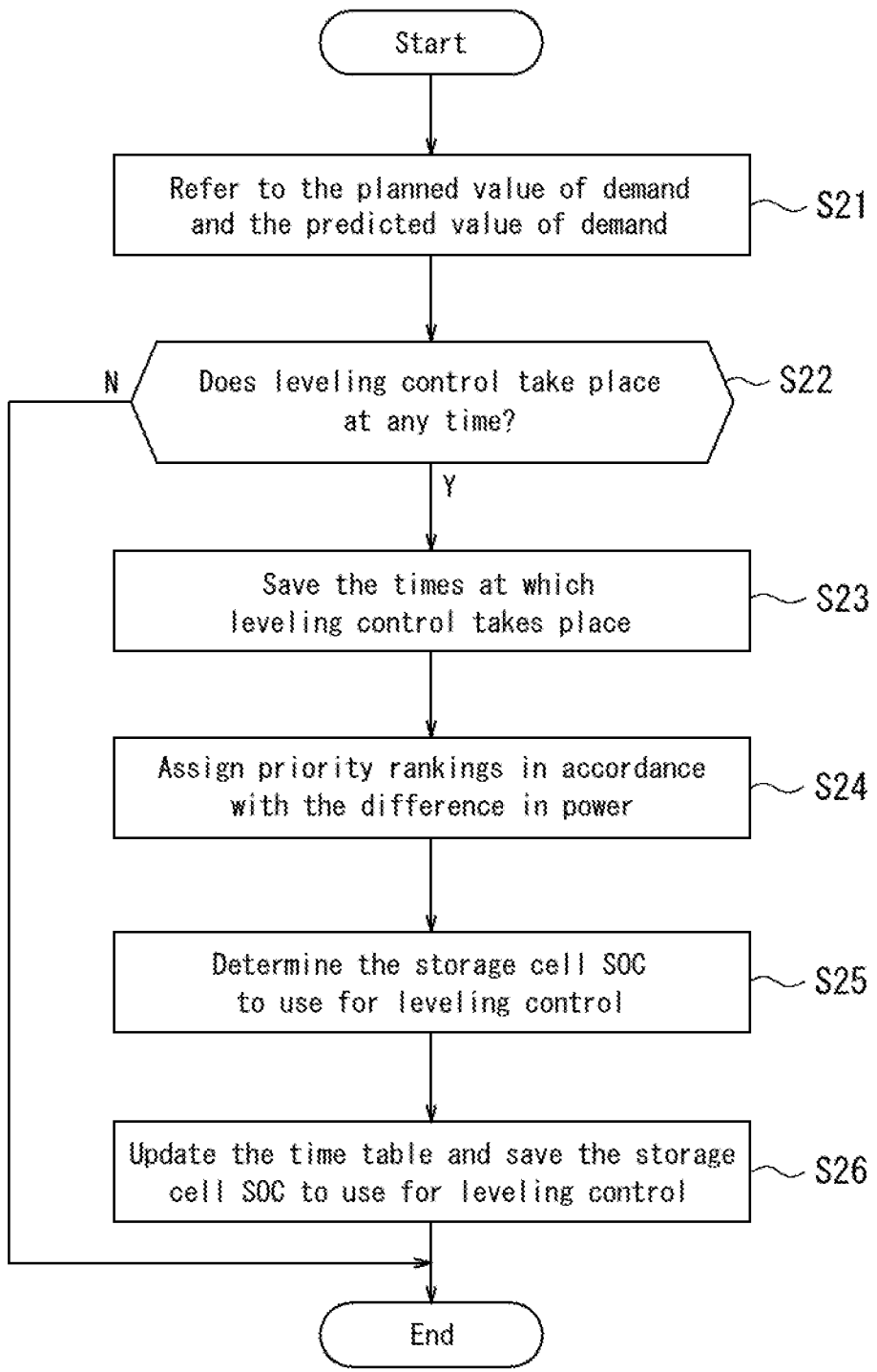
FIG. 9 is a flowchart illustrating operations of a power management apparatus according to an embodiment.

Once the process illustrated in FIG. 9 begins, the controller 11 refers to the planned value of demand and the predicted value of demand for power (step S21). The planned value of demand for power can, for example, be the planned value for the next day that has already been submitted to the power company. Such information can be stored in the memory 13. The planned value of demand is not limited to being the value for a particular individual consumer and can be a value calculated using the value for the entire power consumer group. As described above, the predicted value of demand for power can also, for example, be acquired by the communication interface 12 over the network 5 or the like and be stored in the memory 13.

After referring to the planned value of demand and the predicted value of demand for power in step S21, the controller 11 determines whether leveling control of power takes place at any time (step S22). In greater detail, in step S22, the controller 11 can determine whether the electric energy representing the difference in leveling control of power occurs at any time.

If electric energy representing an incremental difference in leveling control of power occurs at one or more times in step S22, the controller 11 saves those times (step S23). The times are, for example, saved in a leveling control time table in the memory 13, system internal memory, or another memory location. For example, as the incremental difference in the electric energy, information such as the following is saved: a discharge of 4 kWh in the 30 minutes from 8:00 to 8:29 on a specific day, a discharge of 1 kWh in the 30 minutes from 8:30 to 8:59 on that day, and a charge of 3 kWh in the 30 minutes from 14:30 to 14:59 on that day. If the electric energy representing the incremental difference in leveling control of power does not occur at any time in step S22, the controller 11 skips the process in step S23.

After step S23, the controller 11 assigns priority rankings in accordance with the magnitude of the incremental difference for time slots during which the electric energy representing the incremental difference in leveling control occurs (step S24). For example, a time when the electric energy representing the incremental difference in leveling control is a discharge of 8 kW is assigned rank 1, a time when the electric energy representing the incremental difference is a discharge of 6 kW is assigned rank 2, a time when the electric energy representing the difference is a discharge of 4 kW is assigned rank 3, a time when the electric energy representing the difference is a discharge of 1 kW is assigned rank 4, and so forth. Here, the SOC of the storage cell need not be reserved for the times at which the electric energy representing the incremental difference is charged power.

After assigning the priority rankings in step S24, the controller 11 determines the storage cell SOC to use for leveling control of power (step S25).

After determining the storage cell SOC in step S25, the controller 11 updates the leveling control time table and saves the storage cell SOC to use for leveling control (step S26). This information is, for example, saved in the memory 13, system internal memory, or another memory location. For example, the power for leveling control on the specific date and time to which the above-described priority ranking of 1 was assigned is an 8 kW discharge, and a sequence of information determined in order to cover this amount is saved, such as 8% SOC usage of storage cell A, 6% SOC usage of storage cell B, and so forth. This process is performed for each rank.

[Third Process]

Figure 10:
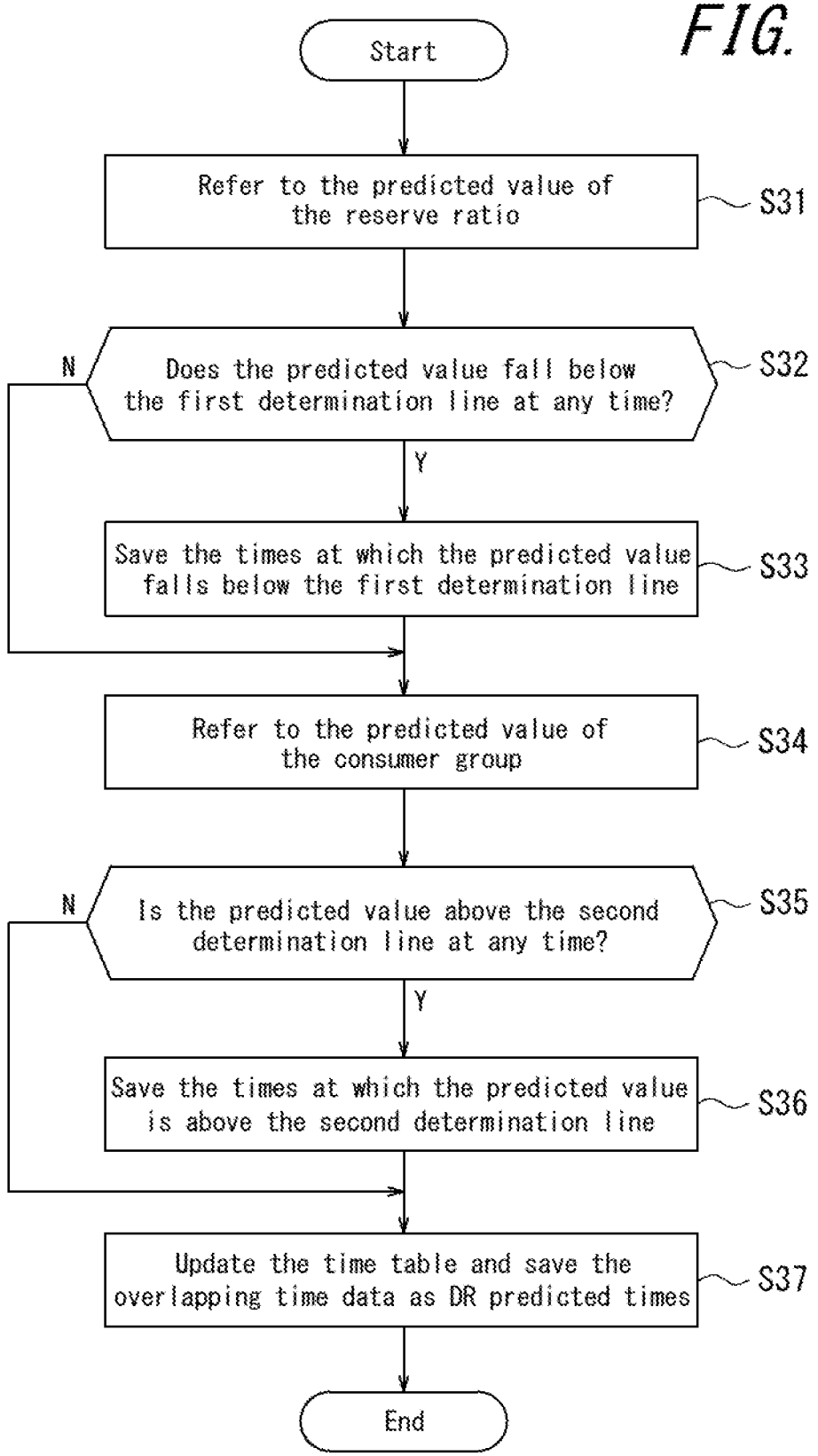
FIG. 10 is a flowchart illustrating operations of a power management apparatus according to an embodiment.

Once the process illustrated in FIG. 10 begins, the controller 11 refers to the predicted value of the reserve ratio of power from the power company (step S31). This predicted value of the reserve ratio of power can, for example, be acquired from the power company by the communication interface 12 over the network 5 or the like and be stored in the memory 13.

After referring to the predicted value of the reserve ratio of power in step S31, the controller 11 determines whether the predicted value of the reserve ratio falls below the first determination line at any time (step S32). In greater detail, as illustrated in FIG. 6A, the first determination line is a predetermined reference value with respect to the predicted value, acquired from the power company on the previous day, of the reserve ratio of power on the next day.

If the predicted value of the reserve ratio falls below the first determination line at one or more times in step S32, the controller 11 saves those times (step S33). The times are, for example, saved in a DR prediction time table in the memory 13, system internal memory, or another memory location. For example, if the predicted value of the reserve ratio falls below the first determination line at 14:00 to 14:29 and 16:00 to 16:29 on a specific day, information on these times is saved. If the predicted value of the reserve ratio in step S32 does not fall below the first determination line at any time in step S32, the controller 11 skips the process in step S33.

Next, in step S33, the controller 11 refers to the predicted value of power for the consumer group (step S34). The latest predicted value of the entire consumer group over a certain area or the like, for example, is preferably referred to as the predicted value of power for the consumer group. When predicting DR, the predicted value for the entire group tends to be more accurate than the predicted value for an individual consumer. The predicted value for the entire group also tends to be more accurate than the predicted value for an individual consumer with regard to the predicted value of time slots in which notification of a DR request is expected. At the time notification of a DR request is received, it is assumed that the aggregator will adjust the way individual consumers comply with the DR request. Therefore, the predicted value of the entire consumer group is preferably used in the third process in this embodiment. This predicted value of the consumer group can, for example, be acquired from the power company by the communication interface 12 over the network 5 or the like and be stored in the memory 13.

After referring to the predicted value of power in step S34, the controller 11 determines whether the predicted value is above the second determination line at any time (step S35). In greater detail, as illustrated in FIG. 6B, the second determination line is a predetermined reference value with respect to the predicted value, acquired from the aggregator or the power management apparatus on the previous day, of the total power of the group on the next day.

If the predicted value is above the second determination line at one or more times in step S35, the controller 11 saves those times (step S36). The times are, for example, saved in a DR prediction time table in the memory 13, system internal memory, or another memory location. For example, if the predicted value of power is above the second determination line at 12:00 to 13:29, 14:00 to 14:29, and 16:00 to 16:59 on a specific day, information on these times is saved. If the predicted value in step S35 is not above the second determination line at any time in step S35, the controller 11 skips the process in step S36.

After step S36, the controller 11 updates the DR prediction time table, selects time data that overlap between the times saved in step S33 and the times saved in step S36 as DR predicted times, and saves the DR predicted times (step S37). In the above-described example, in step S33, the times that fall below the first determination line are 14:00 to 14:29 and 16:00 to 16:29 on a specific day. In step S36, the times that are above the second determination line are 12:00 to 13:29, 14:00 to 14:29, and 16:00 to 16:59 on the specific day. In this case, the times that overlap between the steps are 14:00 to 14:29 and 16:00 to 16:29 on the specific day. In this example, these times are thus selected as DR predicted times.

[Fourth Process]

Figure 11:
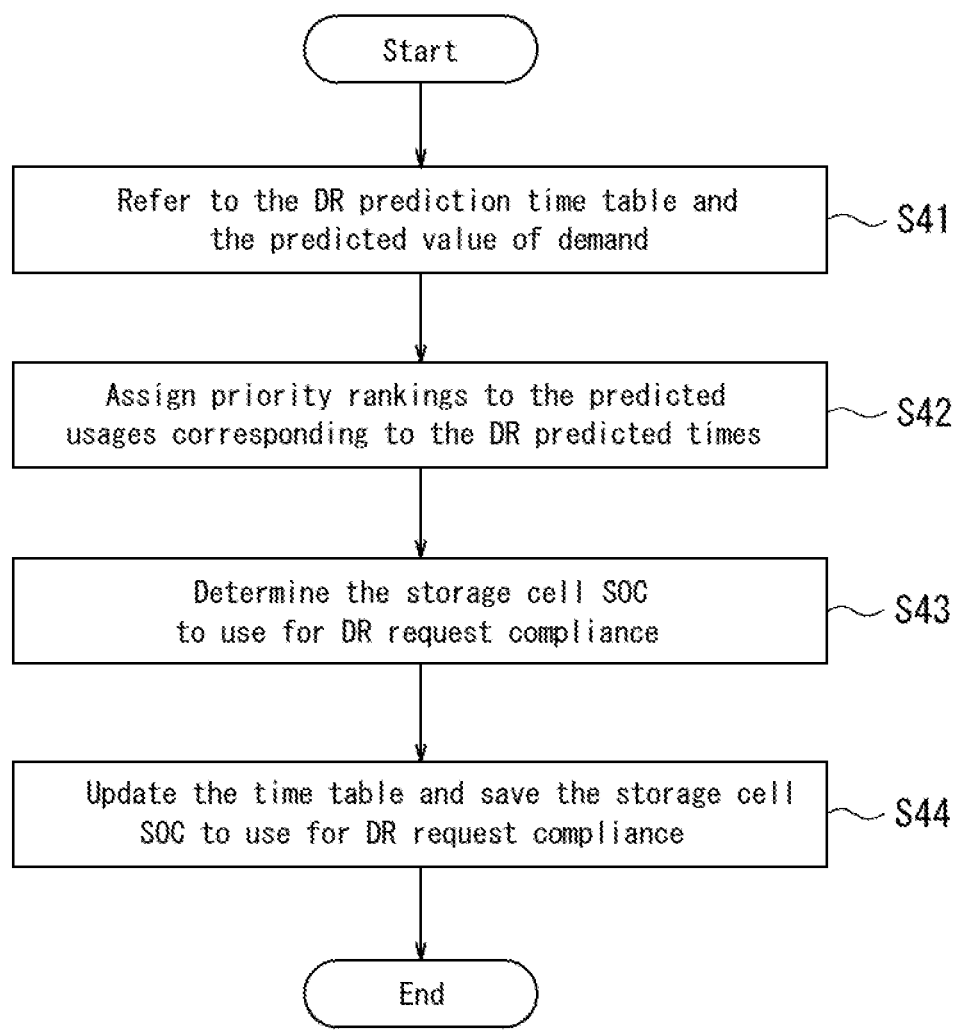
FIG. 11 is a flowchart illustrating operations of a power management apparatus according to an embodiment.

Once the process illustrated in FIG. 11 begins, the controller 11 refers to the DR prediction time table and the predicted value of demand (step S41). This DR prediction time table is the DR prediction time table in which the DR predicted times were saved in step S37 of FIG. 10. As in step S11 of FIG. 8 and step S21 of FIG. 9, the predicted value of demand for power is the latest predicted value of demand and can, for example, be acquired by the communication interface 12 over the network 5 or the like and be stored in the memory 13.

After step S41, the controller 11 assigns priority rankings in accordance with the magnitude of the predicted usage corresponding to the DR predicted time (step S42). For example, the time 14:00 to 14:29 on a specific day, corresponding to a DR predicted time, when the predicted usage is 198 kWh in 30 minutes can be assigned rank 1 as the priority ranking. As another example, the time 16:30 to 16:59 on a specific day, corresponding to a DR predicted time, when the predicted usage is 184 kWh in 30 minutes can be assigned rank 2 as the priority ranking.

After assigning the priority rankings in step S42, the controller 11 determines the storage cell SOC to use when complying with a DR request (step S43).

After determining the storage cell SOC in step S43, the controller 11 updates the DR prediction time table and saves the storage cell SOC to use for DR request compliance (step S44). This information is, for example, saved in the memory 13, system internal memory, or another memory location. For example, in order to cover the power used for DR request compliance on the specific date and time to which the above-described priority ranking of 1 was assigned, a sequence of information such as the determination of 10% SOC usage of storage cell A, 17% SOC usage of storage cell B, and so forth is saved. As another example, in order to cover the power used for DR request compliance on the specific date and time to which the above-described priority ranking of 2 was assigned, a sequence of information such as the determination of 9% SOC usage of storage cell A, 5% SOC usage of storage cell B, and so forth is saved. This process is performed for each rank.

[Fifth Process]

Figure 12:
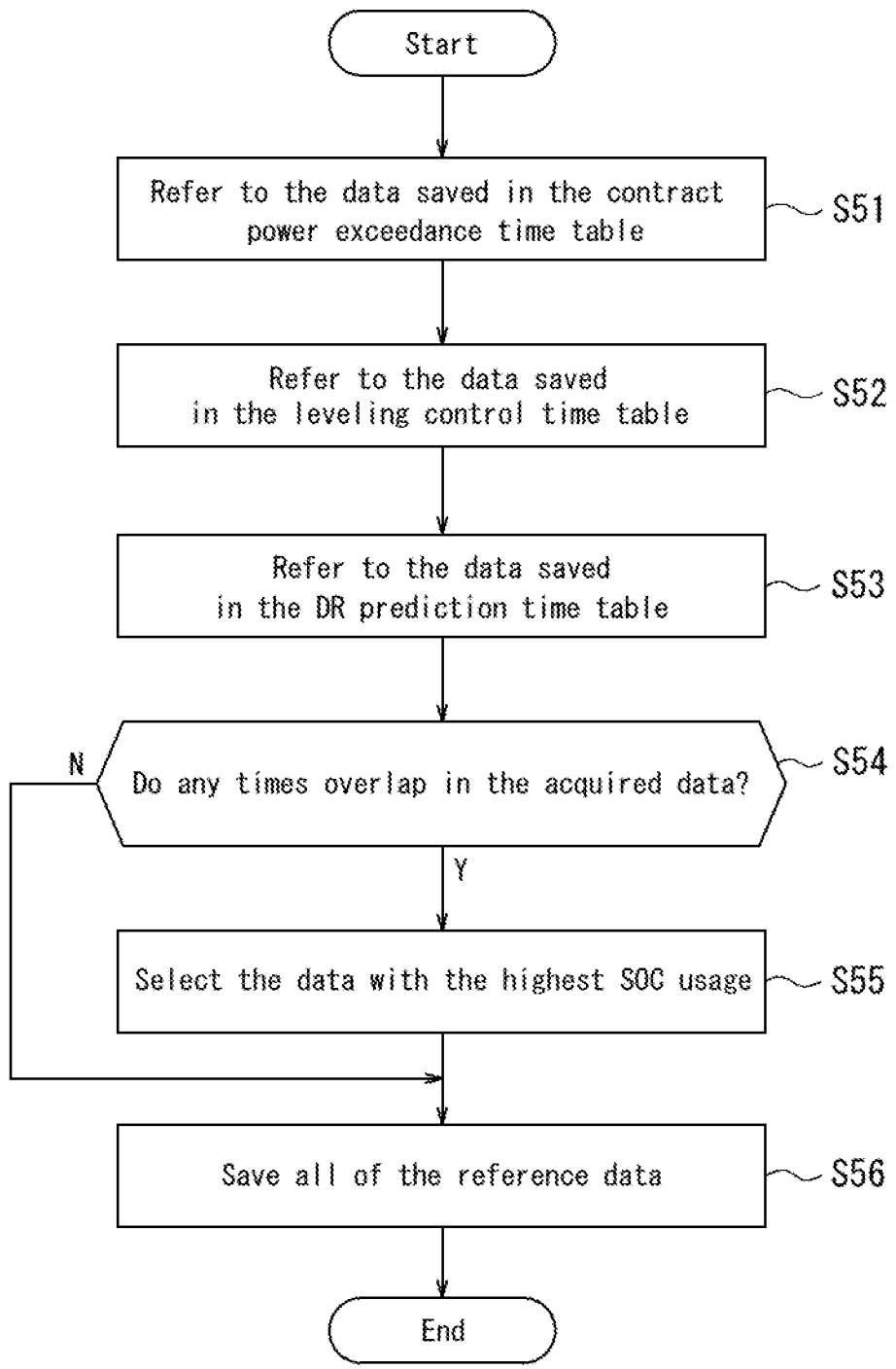
FIG. 12 is a flowchart illustrating operations of a power management apparatus according to an embodiment.

Once the process illustrated in FIG. 12 begins, the controller 11 refers to the data saved in the contract power exceedance time table (step S51). In step S51, the data in the contract power exceedance time table saved in step S16 of FIG. 8 are referred to.

In greater detail, the data referred to from the contract power exceedance time table can be the following type of information. The examples below are all for the same specific day.

11:00 to 11:29 (rank 3): 8% SOC usage of storage cell A, 0% SOC usage of storage cell B 14:00 to 14:29 (rank 1): 9% SOC usage of storage cell A, 15% SOC usage of storage cell B 14:30 to 14:59 (rank 2): 8% SOC usage of storage cell A, 7% SOC usage of storage cell B After step S51, the controller 11 refers to the data saved in the leveling control time table (step S52). The data in the leveling control time table saved in step S26 of FIG. 9 are referred to in step S52.

In greater detail, the data referred to from the leveling control time table can be the following type of information.

8:00 to 8:29 (rank 3): 7% SOC usage of storage cell A, 4% SOC usage of storage cell B 8:30 to 8:59 (rank 4): 1% SOC usage of storage cell A, 1% SOC usage of storage cell B 17:00 to 17:29 (rank 1): 7% SOC usage of storage cell A, 4% SOC usage of storage cell B 17:30 to 17:59 (rank 2): 8% SOC usage of storage cell A, 6% SOC usage of storage cell B After step S52, the controller 11 refers to the data saved in the DR prediction time table (step S53). The data in the DR prediction time table saved in step S37 of FIG. 10 are referred to in step S53.

In greater detail, the data referred to in the DR prediction time table can be the following type of information.

14:00 to 14:29 (rank 1): 10% SOC usage of storage cell A, 17% SOC usage of storage cell B 16:30 to 16:59 (rank 2): 9% SOC usage of storage cell A, 5% SOC usage of storage cell B After step S53, the controller 11 determines whether any times overlap in the data referred to and acquired as described above (step S54).

If one or more times overlap in step S54, the controller 11 selects the data with the largest SOC usage of the storage cell at the overlapping times (step S55).

In greater detail, in the above-described example, the time 14:00 to 14:29 in the contract power exceedance time table and the time 14:00 to 14:29 in the DR prediction time table overlap. Here, 9% SOC usage of storage cell A and 15% SOC usage of storage cell B are indicated for the time 14:00 to 14:29 in the contract power exceedance time table, whereas 10% SOC usage of storage cell A and 17% SOC usage of storage cell B are indicated for the time 14:00 to 14:29 in the DR prediction time table. In this example, the data with the larger SOC usage in the DR prediction time table are selected as the data to be saved.

If no times overlap in step S54, the controller 11 skips the process in step S55.

After step S55, the controller 11 saves all of the reference data (step S56). In step S55, all of the reference data are saved as a reserved SOC table, for example in the memory 13, system internal memory, or another memory location.

In greater detail, the data saved in the reserved SOC table can be the following type of information.

08:00 to 08:29: 7% usage of the SOC of storage cell A, 4% usage of the SOC of storage cell B 08:30 to 08:59: 1% usage of the SOC of storage cell A, 1% usage of the SOC of storage cell B 11:00 to 11:29: 8% usage of the SOC of storage cell A, 0% usage of the SOC of storage cell B 14:00 to 14:29: 10% usage of the SOC of storage cell A, 17% usage of the SOC of storage cell B 14:30 to 14:59: 8% usage of the SOC of storage cell A, 7% usage of the SOC of storage cell B 16:30 to 16:59: 9% usage of the SOC of storage cell A, 5% usage of the SOC of storage cell B 17:00 to 17:29: 7% usage of the SOC of storage cell A, 4% usage of the SOC of storage cell B 17:30 to 17:59: 8% usage of the SOC of storage cell A, 6% usage of the SOC of storage cell B In this way, the power management apparatus 1 according to this embodiment calculates the capacity for DR request compliance from the SOC of the storage cell and the planned value of power supply and demand and implements leveling control with capacity other than the capacity for DR request compliance. Consequently, unnecessary capacity is reduced, and both leveling control and DR request compliance can be achieved.

The power management apparatus 1 according to this embodiment reserves capacity according to priority rankings determined in accordance with financial impact and then charges and discharges the storage cell after determining each capacity. In this way, a financial loss that would occur by not performing a discharging operation can be prevented.

The power management apparatus 1 according to this embodiment also determines whether to comply with a DR request using the power supply reserve ratio acquired from the power company and the planned value of power supply and demand, acquired by the power management apparatus for example over a network, for the entire contract area (group of contracting stores or the like) where the system is located. As a result, even when DR request information cannot be acquired the day before, it can be determined more accurately whether a DR request will be issued.

The power management apparatus 1 according to this embodiment reserves capacity in accordance with the SOC of storage cell. Therefore, at the time of storing electricity for leveling control, an operation that slows the progress of deterioration of the storage cell can be performed.

Typically, storage cells installed in households, in commercial facilities such as stores, and in businesses are used for power adjustment and peak cutting by charging at night and discharging during the day and are also used to adjust power for the purpose of DR request compliance. Storage cells are thus not envisioned as being used for power leveling. Also, as described above, DR requests are limited to particular times of the year. The usage frequency of the storage cell thus varies depending on environmental factors, such as the season or the weather. For example, storage cells are not used every day throughout the year, and charging/discharging control of the storage cells is performed infrequently. It is known, therefore, that only a small financial effect is achieved through use of a storage cell over an extended period of time, such as a year. Accordingly, it is difficult to obtain significant revenue by only operating storage cells for DR request compliance.

Also, the storage cells installed in locations such as a power generation system, a consumer facility, or a PPS are used to keep the power supply and demand amount within the variable range of the supply/demand balance, and sufficient capacity for complying with a DR request is not reserved in these storage cells. It is thus known that the effect obtained by storage cell operations during an emergency is small. Furthermore, a storage cell installed in households, stores, businesses, or other such locations rarely has a capacity of several hundred kWh to several MWh, since such large-capacity storage cells are problematic in terms of cost, installation space, and the like. Therefore, upon implementing both DR request compliance and leveling control with such a storage cell, it is envisioned that the remaining power in the storage cell will be used up by the leveling control. In this case, since the power cannot be adjusted with the storage cell in a time slot with large power usage, it is envisioned that compliance with a DR request will not be possible. It is also envisioned that electricity charges will increase because of the contract power being exceeded.

However, even in these circumstances, the power management apparatus according to this embodiment can appropriately control a storage cell to the consumer's economic advantage by performing control from among maximum peak control, DR request compliance, and leveling control.

When the power management apparatus 1 according to embodiments of this disclosure is configured as a computer, a program containing a description of the processing for achieving the functions is stored within the computer or in an external memory, and the functions are achieved by the central processing unit (CPU) of the computer reading and executing the program. Such a program may, for example, be distributed by the sale, transfer, lending, or the like of a portable recording medium such as a DVD, CD-ROM, or the like. Such a program may also, for example, be distributed by being stored in the memory of a server on a network and then transferred from the server to another computer over the network. For example, the computer that executes such a program can temporarily store, in its own memory, the program recorded on the portable recording medium or transferred from the server. As another embodiment of the program, a computer may read the program directly from the portable recording medium and execute processing in accordance with the program, or each time the program is transferred from the server to the computer, the computer may execute processing in accordance with the received program. Accordingly, this disclosure is not limited to the above-described embodiments, and a variety of modifications may be made without departing from the spirit and scope thereof, for example by combining or partially omitting features.

Although this disclosure has been described with reference to the accompanying drawings and examples, it is to be noted that various changes and modifications will be apparent to those skilled in the art based on this disclosure. Therefore, such changes and modifications are to be understood as included within the scope of the present disclosure. For example, the functions and the like included in the various functional components, means, and steps may be reordered in any logically consistent way. Furthermore, functional components or steps may be combined into one or divided. The above embodiments of the present disclosure are not limited to being implemented precisely as described and may be implemented by combining or partially omitting the features thereof.

Much of the subject matter of the present disclosure is described as a series of operations executed by a computer system and other hardware that can execute program instructions. Examples of the computer system and other hardware include a general-purpose computer, a personal computer (PC), a dedicated computer, a workstation, a personal communications system (PCS), an electronic notepad, a laptop computer, and other programmable data processing apparatuses. It should be noted that in each embodiment, various operations are executed by a dedicated circuit (for example, individual logical gates interconnected in order to execute a particular function) implemented by program instructions (software), or by a logical block, program module, or the like executed by one or more processors. The one or more processors that execute a logical block, program module, or the like are, for example, one or more of each of the following: a microprocessor, a central processing unit (CPU), an application specific integrated circuit (ASIC), a digital signal processor (DSP), a programmable logic device (PLD), a field programmable gate array (FPGA), a controller, a microcontroller, an electronic device, another apparatus designed to be capable of executing the functions disclosed herein, and/or a combination of any of the above. The disclosed embodiments are, for example, implemented by hardware, software, firmware, middleware, microcode, or a combination of any of these.

The machine-readable, non-transitory storage medium used here may also be configured as a computer-readable, tangible carrier (medium) in the categories of solid-state memory, magnetic disks, and optical discs. Data structures and an appropriate set of computer instructions, such as program modules, for causing a processor to execute the techniques disclosed herein are stored on these media. Examples of computer-readable media include an electrical connection with one or more wires, a magnetic disk storage medium, or another magnetic or optical storage medium (such as a compact disc (CD), digital versatile disc (DVD®), and Blu-ray disc (DVD is a registered trademark in Japan, other countries, or both)), portable computer disk, random access memory (RAM), read-only memory (ROM), rewritable programmable ROM such as EPROM, EEPROM, or flash memory, another tangible storage medium that can store information, or a combination of any of these. The memory may be provided internal and/or external to a processor or processing unit. As used in this disclosure, the term "memory" refers to all types of long-term storage, short-term storage, volatile, non-volatile, or other memory. No limitation is placed on the particular type or number of memories, or on the type of medium for memory storage.

REFERENCE SIGNS LIST

1 Power management apparatus
2 Storage cell system
3 Power generator control system
4 Power generator
5 Network
6 Power grid
11 Controller
12 Communication interface
13 Memory
21 PCS
22 Storage cell

The invention claimed is:

1. A power management apparatus comprising:
a controller configured to control an amount of stored electricity in a storage cell installed in a consumer facility; and
a communication interface configured to acquire a demand response request issued over a network,
wherein the controller
divides the amount of stored electricity at least into a first domain and a second domain and manages the first domain and the second domain,
treats the first domain as a domain in which to perform long-term control during power management in the consumer facility, and
treats the second domain as a domain in which to perform short-term control during power management in the consumer facility,
wherein the controller, upon acquisition of the demand response request issued over a network, performs the long-term control in the first domain if a predetermined period of time in the demand response request is longer than a reference period of time, and performs the short-term control in the second domain if the predetermined period of time in the demand response request is shorter than the reference period of time,
wherein the controller controls, with the long-term control, the amount of stored electricity in accordance with an integrated power consumption during the predetermined period of time in the consumer facility, and
wherein the controller controls, with the short-term control, the amount of stored electricity in accordance with an instantaneous value of power consumption in the consumer facility.

2. The power management apparatus of claim 1, wherein the controller controls, with the long-term control, the amount of stored electricity to prevent the integrated power consumption from exceeding a predetermined threshold during the predetermined time period.

3. The power management apparatus of claim 1, wherein the controller reduces, with the long-term control, a peak of the power consumption during the predetermined time period.

4. The power management apparatus of claim 1, wherein the controller reduces, with the short-term control, the instantaneous value or maintains the instantaneous value in a certain range.

5. The power management apparatus of claim 1, wherein the controller controls, with the short-term control, the amount of stored electricity to perform leveling that reduces an incremental difference with respect to a purchased power established by a power purchase plan.

6. The power management apparatus of claim 4, wherein the controller keeps, with the short-term control, variation in actual power consumption within the certain range upon acquisition of the demand response request.

7. The power management apparatus of claim 1, wherein the controller varies, by season, a ratio between the first domain and the second domain or the amount of stored electricity allocated to each of the first domain and the second domain.

8. The power management apparatus of claim 7, wherein the controller allocates a larger amount of stored electricity to the first domain in summer or winter than in spring or autumn.

9. The power management apparatus of claim 1, wherein the controller performs whichever of the short-term control and the long-term control has higher economic efficiency on a priority basis.

10. The power management apparatus of claim 1, wherein the reference period of time is 60 minutes or less.

11. A power management system comprising:
a storage cell; and
a power management apparatus installed in a consumer facility;
wherein the power management apparatus comprises a controller configured to control an amount of stored electricity in the storage cell, and a communication interface configured to acquire a demand response request issued over a network,
wherein the controller
divides the amount of stored electricity at least into a first domain and a second domain and manages the first domain and the second domain,
treats the first domain as a domain in which to perform long-term control during power management in the consumer facility, and treats the second domain as a domain in which to perform short-term control during power management in the consumer facility, and wherein the controller, upon acquisition of the demand response request issued over a network, performs the long-term control in the first domain if a predetermined period of time in the demand response request is longer than a reference period of time, and performs the short-term control in the second domain if the predetermined period of time in the demand response request is shorter than the reference period of time, wherein the controller controls, with the long-term control, the amount of stored electricity in accordance with an integrated power consumption during the predetermined period of time in the consumer facility, and wherein the controller controls, with the short-term control, the amount of stored electricity in accordance with an instantaneous value of power consumption in the consumer facility.

12. A power management method in a power management apparatus installed in a consumer facility, the method comprising:

dividing an amount of stored electricity of a storage cell at least into a first domain and a second domain and managing the first domain and the second domain, wherein the first domain is treated as a domain in which to perform long-term control during power management in the consumer facility, and the second domain is treated as a domain in which to perform short-term control during power management in the consumer facility;

acquiring a demand response request issued over a network; and, upon acquisition of the demand response request issued over a network, performing the long-term control in the first domain if a predetermined period of time in the demand response request is longer than a reference period of time, and performing the short-term control in the second domain if the predetermined period of time in the demand response request is shorter than the reference period of time, wherein the storage cell is controlled, with the long-term control, in accordance with an integrated power consumption during the predetermined period of time in the consumer facility, and wherein the storage cell is controlled, with the short-term control, in accordance with an instantaneous value of power consumption in the consumer facility.

* * * * *